United States Patent
Bathwal et al.

(10) Patent No.: US 10,623,989 B2
(45) Date of Patent: Apr. 14, 2020

(54) TECHNIQUES AND APPARATUSES FOR UNIDIRECTIONAL ROBUST HEADER COMPRESSION

(71) Applicant: QUALCOMM Incorporated, San Diego, CA (US)

(72) Inventors: Saket Bathwal, Hyderbad (IN); Shailesh Maheshwari, San Diego, CA (US); Gang Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/704,761

(22) Filed: Sep. 14, 2017

(65) Prior Publication Data

US 2018/0124639 A1     May 3, 2018

(30) Foreign Application Priority Data

Oct. 27, 2016  (IN) .............................. 201641036985

(51) Int. Cl.
*H04W 28/06* (2009.01)
*H04L 29/06* (2006.01)
*H04W 88/02* (2009.01)
*H04W 88/08* (2009.01)

(52) U.S. Cl.
CPC ............. *H04W 28/06* (2013.01); *H04L 69/04* (2013.01); *H04L 69/16* (2013.01); *H04W 88/02* (2013.01); *H04W 88/08* (2013.01)

(58) Field of Classification Search
CPC ........ H04W 28/06; H04W 88/08; H04L 69/04
See application file for complete search history.

(56) References Cited

U.S. PATENT DOCUMENTS

| | | | |
|---|---|---|---|
| 9,072,007 B2 | 6/2015 | Liu et al. | |
| 9,112,714 B2 | 8/2015 | Jin et al. | |
| 9,154,588 B2 | 10/2015 | Sridhar et al. | |
| 9,544,404 B2 | 1/2017 | Shah et al. | |
| 2002/0091860 A1* | 7/2002 | Kalliokulju | H04L 12/28 709/247 |
| 2010/0103865 A1* | 4/2010 | Ulupinar | H04L 29/12207 370/315 |
| 2013/0322331 A1* | 12/2013 | Ramkumar | H04W 28/10 370/328 |

(Continued)

OTHER PUBLICATIONS

International Search Report and Written Opinion—PCT/US2017/051785—ISA/EPO—dated Oct. 27, 2017.

*Primary Examiner* — Muthuswamy G Manoharan
(74) *Attorney, Agent, or Firm* — Harrity & Harrity, LLP

(57) ABSTRACT

Certain aspects of the present disclosure generally relate to wireless communications. In some aspects, a method, apparatus, system, computer program product, non-transitory computer-readable medium, user equipment, transmitter device, and wireless communication device are presented for unidirectional robust header compression (RoHC). The transmitter device may identify a system resource condition of at least one of the transmitter device or a receiver device of one or more data units, configure robust header compression in a single direction for wireless communication of the one or more data units between the transmitter device and the receiver device, and/or process the data units based at least in part on configuring the robust header compression. Numerous other aspects are provided.

30 Claims, 13 Drawing Sheets

(56) References Cited

U.S. PATENT DOCUMENTS

| | | | |
|---|---|---|---|
| 2014/0133454 A1* | 5/2014 | Chan | H04L 69/04 |
| | | | 370/331 |
| 2016/0088460 A1 | 3/2016 | Kim et al. | |
| 2016/0142518 A1 | 5/2016 | Raina et al. | |
| 2016/0286008 A1* | 9/2016 | Perez Martinez | H04L 69/04 |
| 2017/0257796 A1* | 9/2017 | Hsu | H04W 28/06 |

* cited by examiner

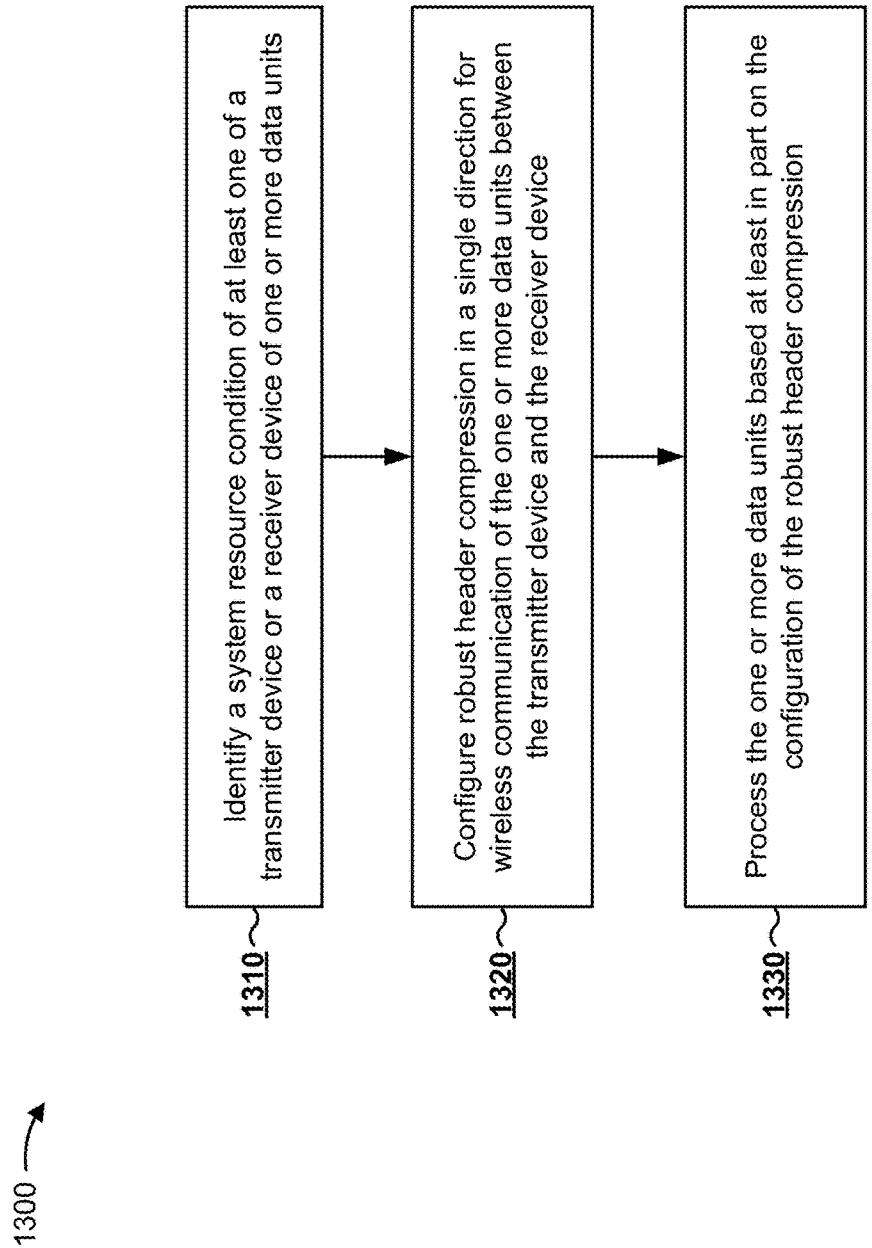

TECHNIQUES AND APPARATUSES FOR UNIDIRECTIONAL ROBUST HEADER COMPRESSION

CROSS-REFERENCE TO RELATED APPLICATION UNDER 35 U.S.C. § 119

This application claims priority to Indian Patent Application No. 201641036985, filed Oct. 27, 2016, entitled "TECHNIQUES AND APPARATUSES FOR UNIDIRECTIONAL ROBUST HEADER COMPRESSION," which is hereby expressly incorporated by reference herein.

FIELD OF THE DISCLOSURE

Aspects of the present disclosure generally relate to wireless communications, and more particularly to techniques and apparatuses for unidirectional robust header compression (RoHC) (e.g., configuring and/or processing based at least in part on such unidirectional RoHC).

BACKGROUND

Wireless communications systems are widely deployed to provide various telecommunication services, such as telephony, video, data, messaging, and broadcasts. Typical wireless communications systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communications by a wireless communication device may include configuring wireless communications of one or more data units between a transmitter device and a receiver device for unidirectional robust header compression; and processing the data units based at least in part on the configuration. In some aspects, processing the data units based at least in part on the configuration includes compressing a subset of data units to be transmitted. In some aspects, the wireless communication device may transmit a message indicating the compressed subset of data units. In some aspects, compressing the subset of data units to be transmitted includes compressing the subset of data units to be transmitted based at least in part on a token based mechanism. In some aspects, processing the data units based at least in part on the configuration includes compressing the one or more data units based at least in part on a type of data unit. In some aspects, configuring wireless communications of the one or more data units between the transmitter and the receiver for unidirectional robust header compression includes configuring wireless communications of the one or more data units between the transmitter and the receiver for unidirectional robust header compression in response to a message received over an air interface. In some aspects, the wireless communication device may identify a system resource condition, wherein configuring the wireless communications of the one or more data units between the transmitter and the receiver for unidirectional robust header compression includes configuring the wireless communications of the one or more data units between the transmitter and the receiver for unidirectional robust header compression based at least in part on the identifying.

In some aspects, an apparatus for wireless communications may include means for configuring wireless communications of one or more data units between a transmitter device and a receiver device for unidirectional robust header compression; and means for processing the data units based at least in part on the configuration.

In some aspects, a method of wireless communication performed by a transmitter device may include identifying a system resource condition of at least one of the transmitter device or a receiver device of one or more data units, configuring robust header compression in a single direction for wireless communication of the one or more data units between the transmitter device and the receiver device, and/or processing the one or more data units based at least in part on configuring the robust header compression.

In some aspects, a transmitter device for wireless communication may include a memory and one or more processors operatively coupled to the memory and configured to identify a system resource condition of at least one of the transmitter device or a receiver device of one or more data units, configure robust header compression in a single direction for wireless communication of the one or more data units between the transmitter device and the receiver device, and/or process the data units based at least in part on configuring the robust header compression.

In some aspects, an apparatus for wireless communication may include means for identifying a system resource condition of at least one of the apparatus or a receiver device of one or more data units, wherein the apparatus is configured to be a transmitter device of the one or more data units, means for configuring robust header compression in a single direction for wireless communication of the one or more data units between the apparatus and the receiver device, and/or means for processing the one or more data units based at least in part on configuring the robust header compression.

In some aspects, a non-transitory computer-readable medium may store one or more instructions for wireless communication, the one or more instructions comprising one or more instructions that, when executed by one or more processors of a transmitter device, cause the one or more processors to identify a system resource condition of at least one of the transmitter device or a receiver device of one or more data units, configure robust header compression in a single direction for wireless communication of the one or more data units between the transmitter device and the receiver device, and/or process the data units based at least in part on configuring the robust header compression.

Aspects generally include a method, apparatus, system, computer program product, non-transitory computer-readable medium, user equipment, wireless communication device, transmitter device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 13 is a diagram illustrating an example process performed, for example, by a transmitter device, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communications networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
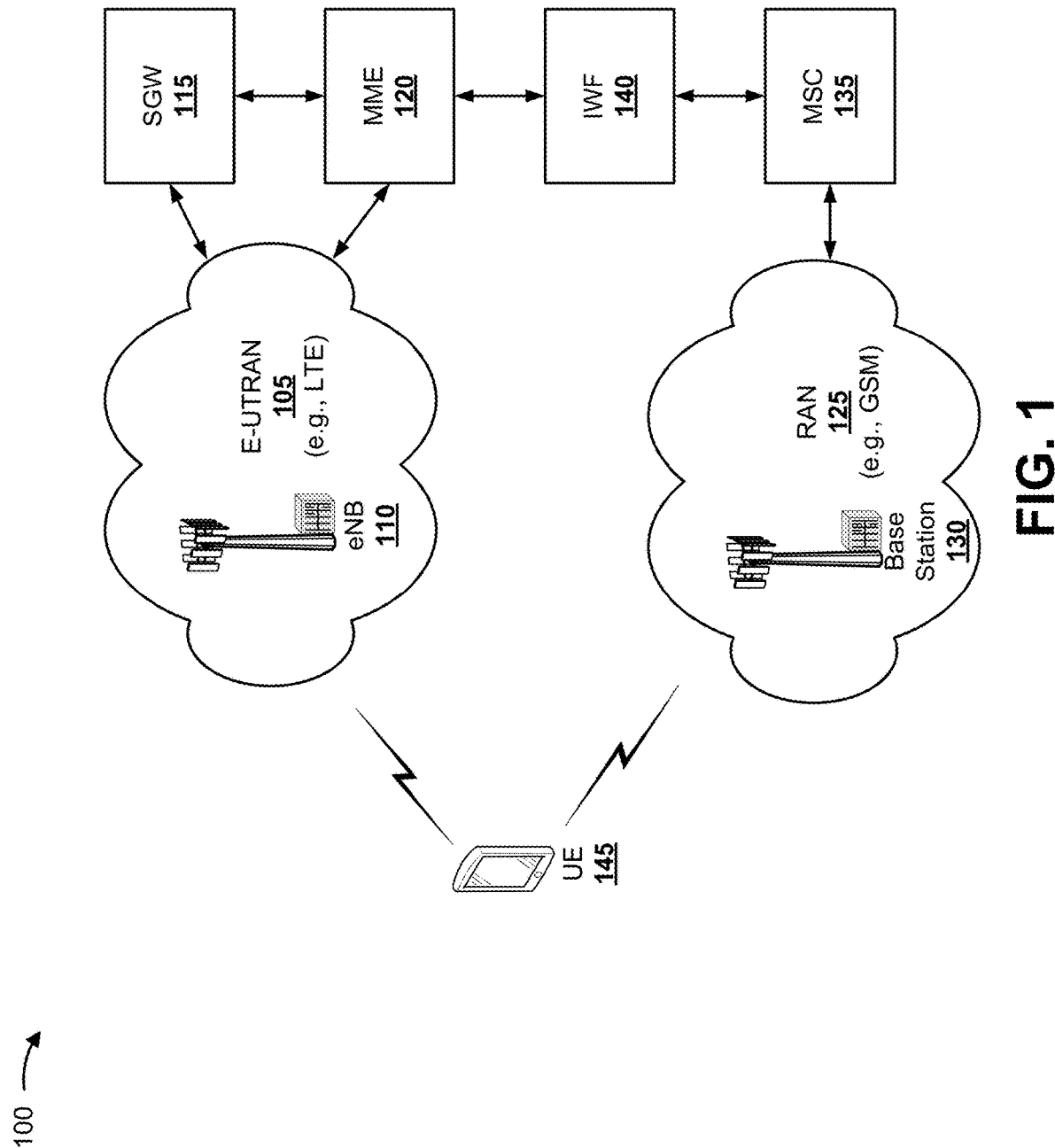
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communications for UEs 145. Each eNB 110 may provide communication coverage for a particular geographic area. The term "cell" may refer to a coverage area of eNB 110 and/or an eNB subsystem serving the coverage area.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communications for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
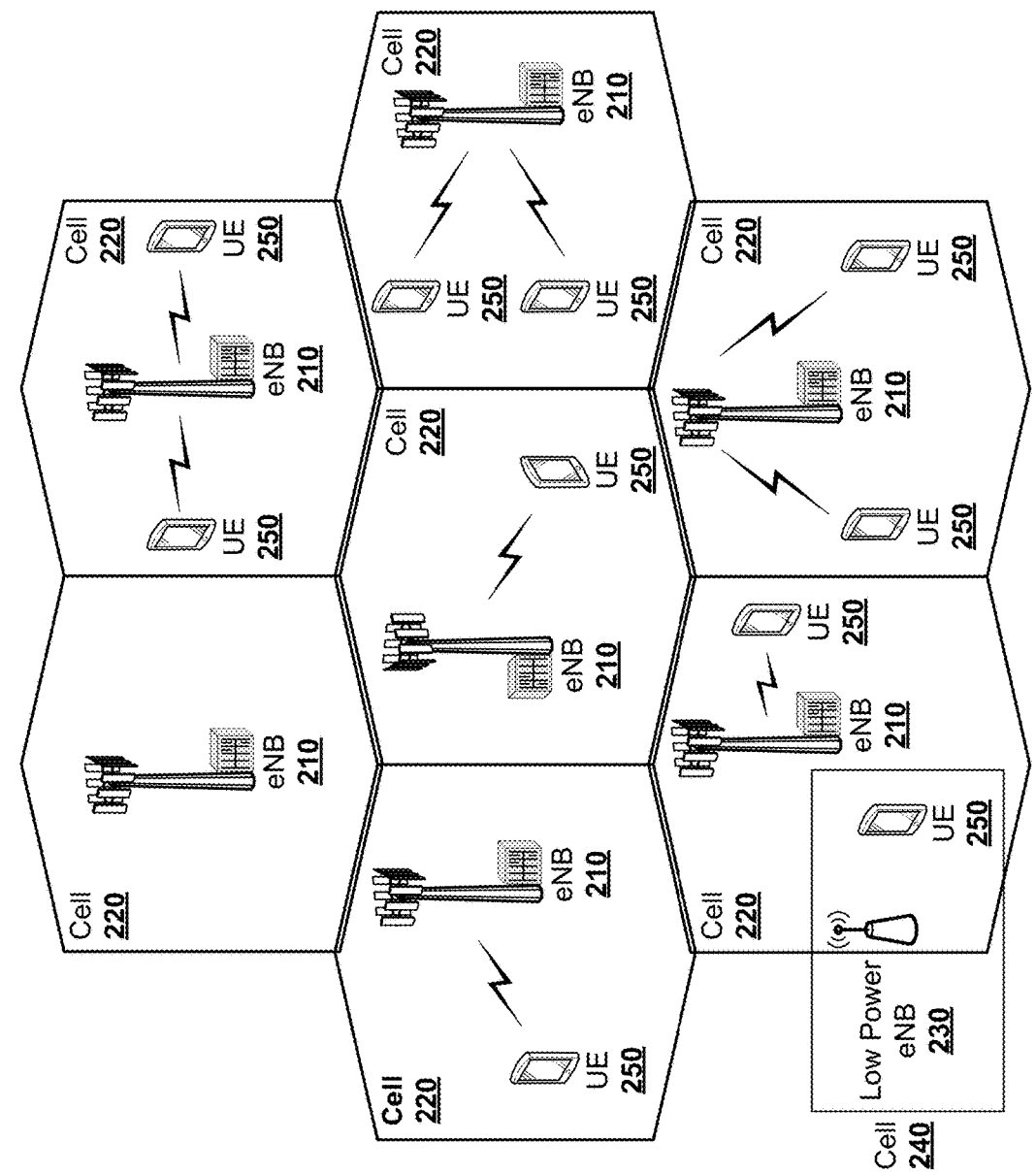
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, orthogonal frequency division multiplexing (OFDM) is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communications standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver device to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
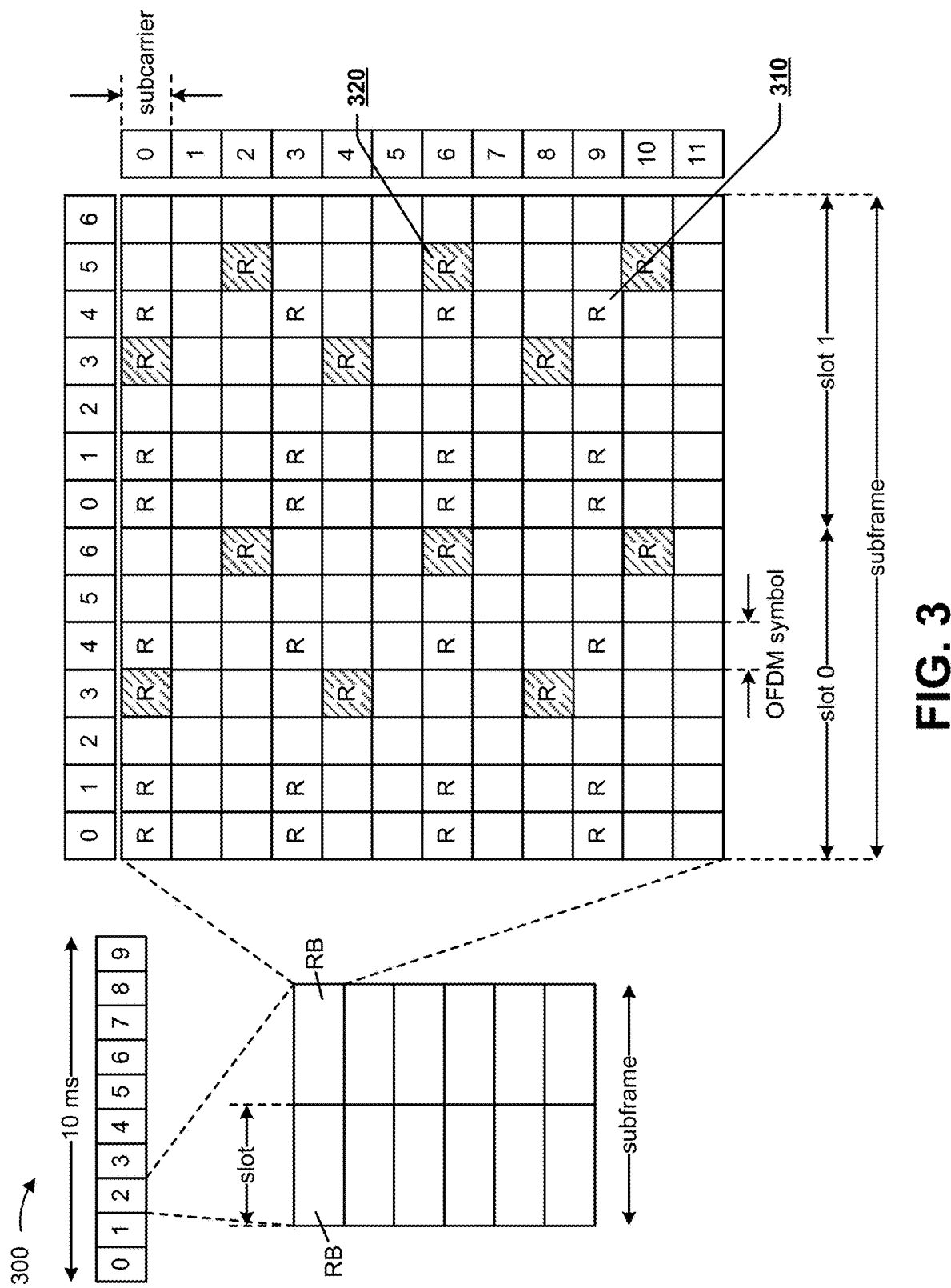
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
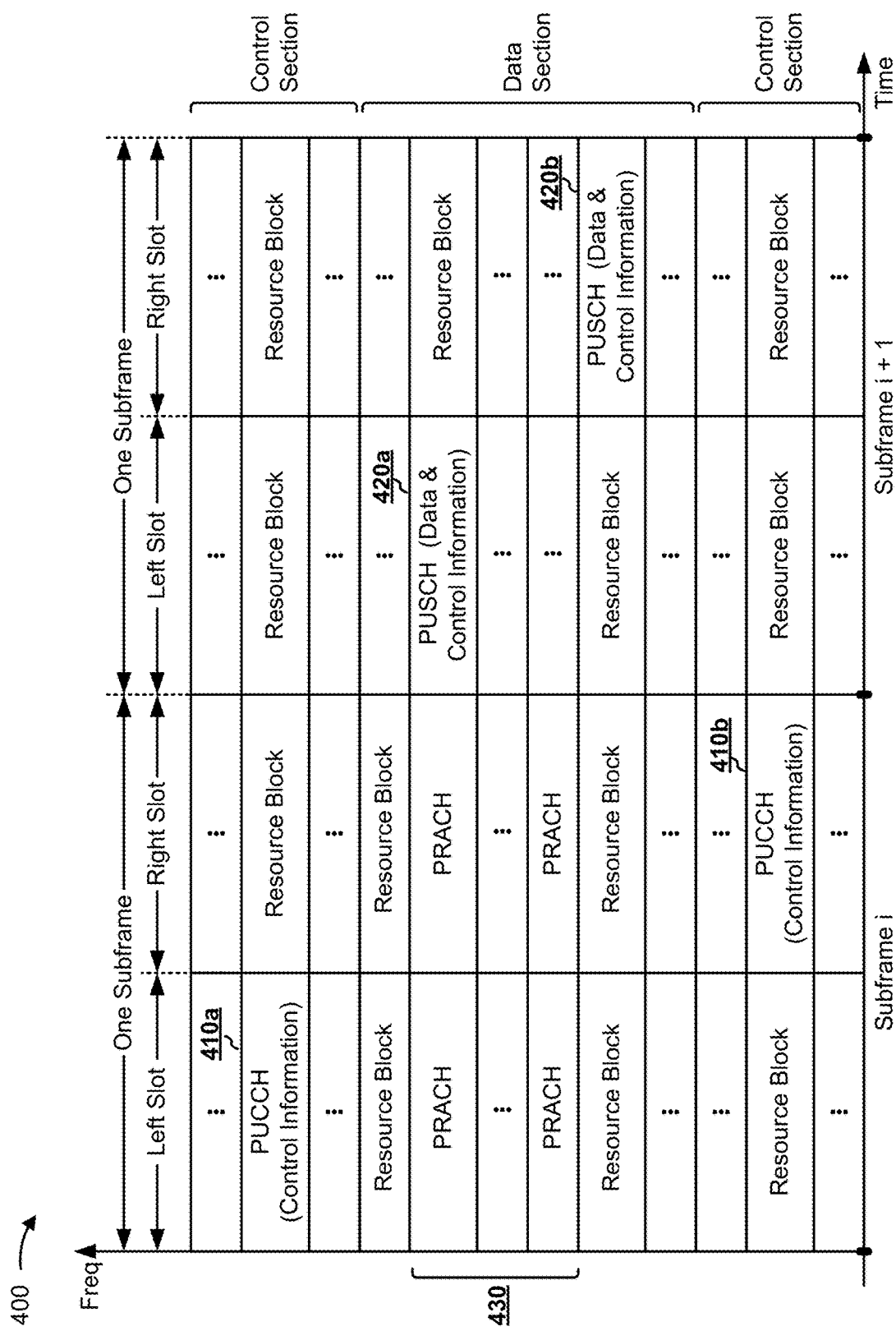
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
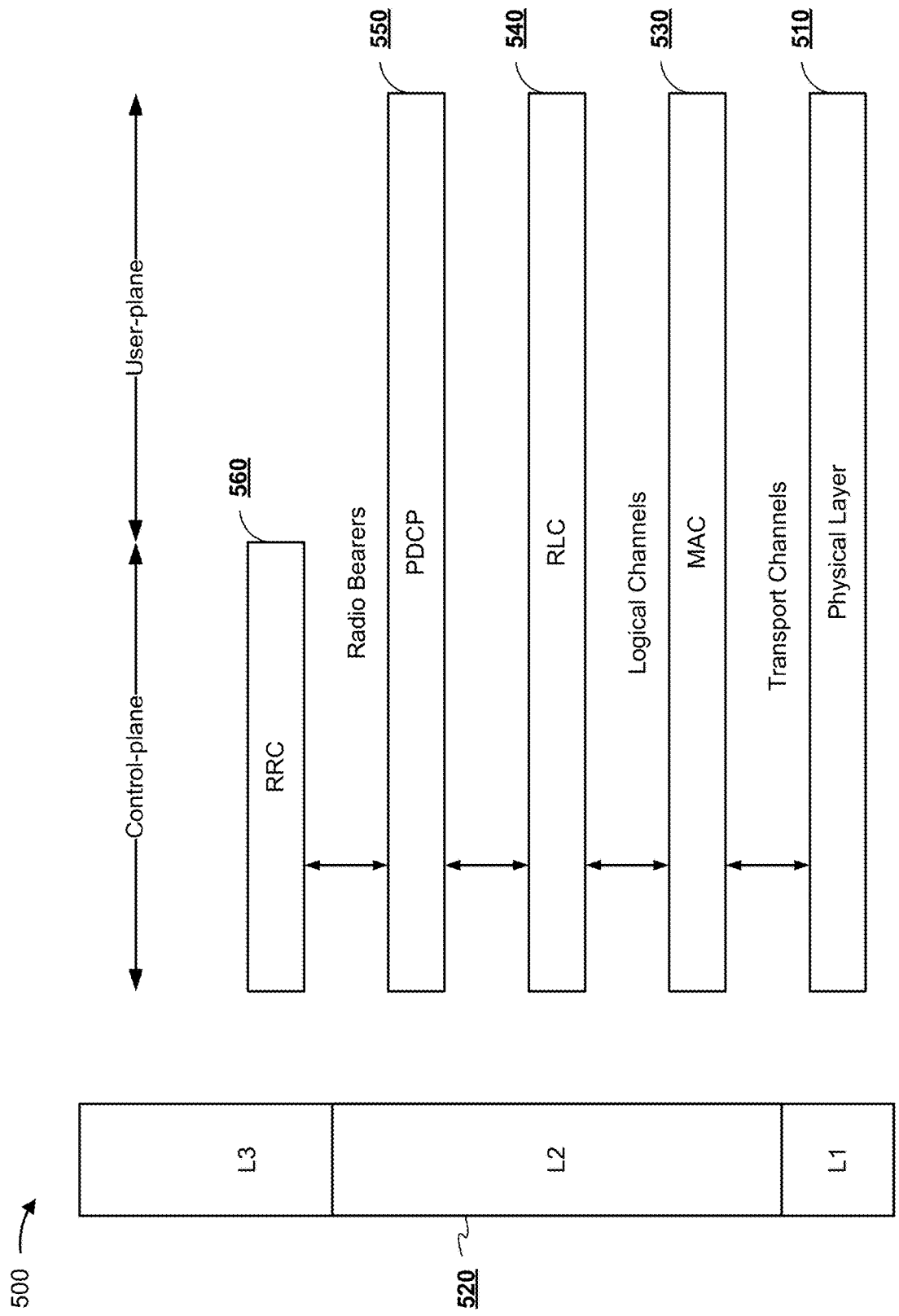
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, and/or the like).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
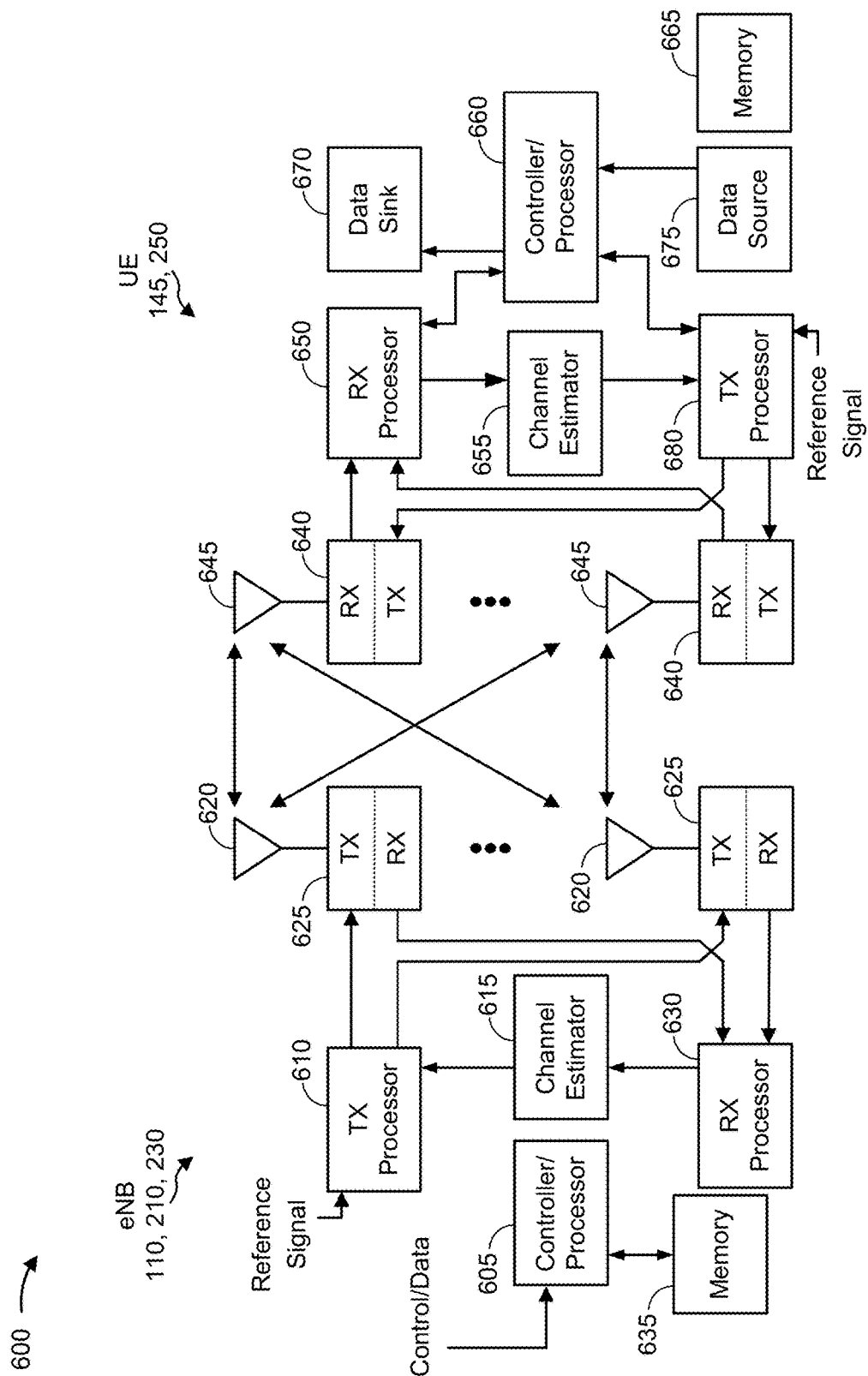
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform unidirectional RoHC (e.g., for a Transmission Control Protocol/Internet Protocol (TCP/IP) traffic flow), as described in more detail elsewhere herein. For example, the controller/processor 660 and/or other processors and modules of UE 145, 250 may perform or direct operations of, for example, process 1200 of FIG. 12, process 1300 of FIG. 13, and/or other processes as described herein. In some aspects, one or more of the components shown in FIG. 6 may be employed to perform example process 1200, example process 1300, and/or other processes for the techniques described herein.

In some aspects, UE 145, 250 may include means for identifying a system resource condition of at least one of UE 145, 250 or a receiver device of one or more data units, means for configuring robust header compression in a single direction for wireless communication of the one or more data units between the UE 145, 250 and the receiver device, means for processing the one or more data units based at least in part on configuring the robust header compression, means for compressing a subset of the one or more data units, means for transmitting a message indicating the subset of the one or more data units, means for compressing the subset of the one or more data units to be transmitted based at least in part on a token based mechanism, means for compressing the one or more data units based at least in part on a type of the one or more data units, means for configuring robust header compression in a single direction based at least in part on a message received over an air interface, means for compressing a portion of a data unit of the one or more data units, and/or the like. In some aspects, such means may include one or more components of UE 145, 250 described in connection with FIG. 6.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
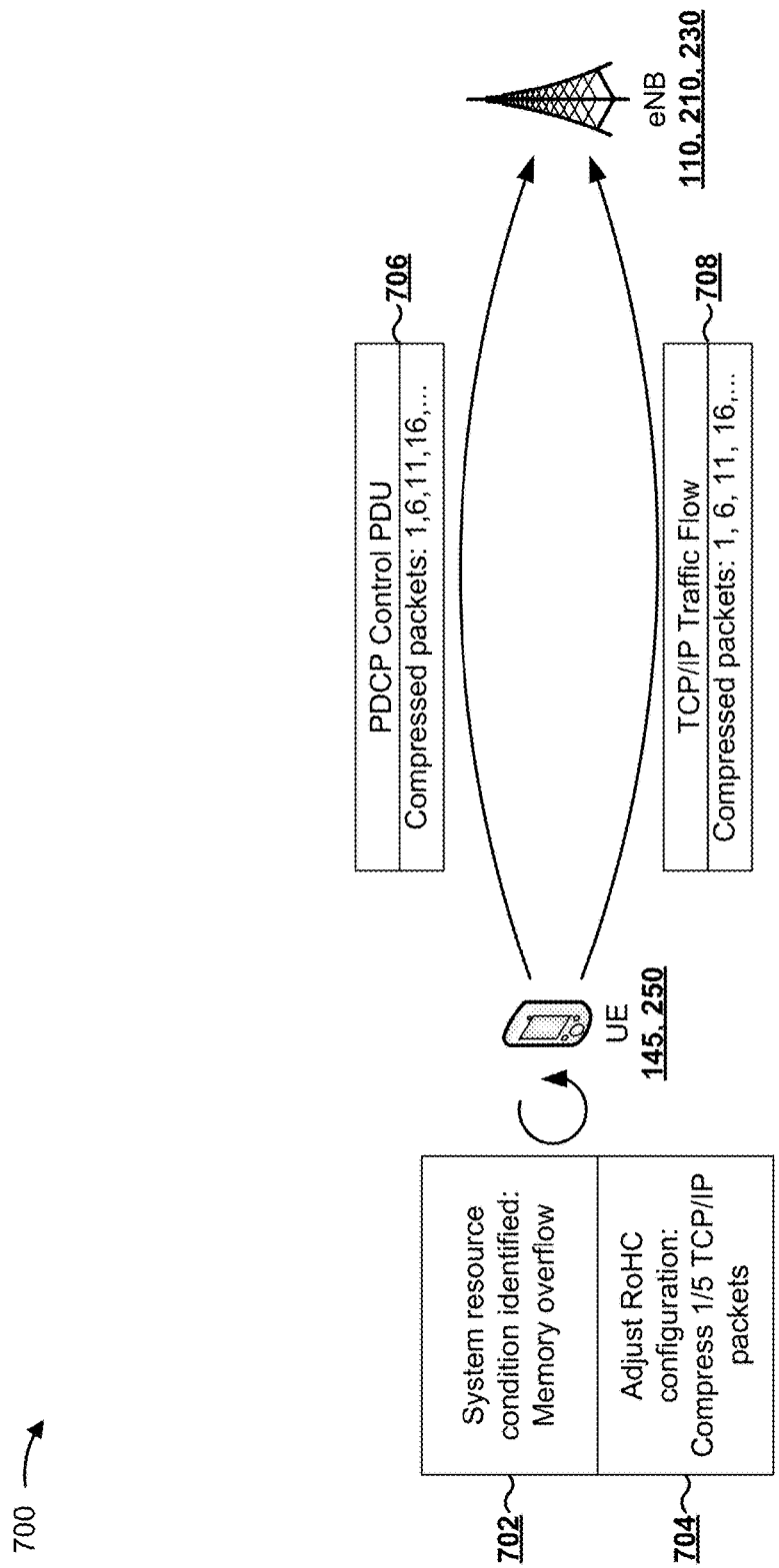
FIG. 7 is a diagram illustrating an example of unidirectional RoHC for a Transmission Control Protocol/Internet Protocol (TCP/IP) traffic flow, in accordance with various aspects of the present disclosure.

FIG. 7 is a diagram illustrating an example 700 of unidirectional RoHC (e.g., for a TCP/IP traffic flow), in accordance with various aspects of the present disclosure. A UE 145, 250 or eNB 110, 210, 230 may perform RoHC to compress IP, User Data Protocol (UDP), Real-time Transport Protocol (RTP), and/or TCP headers (e.g., data units) of Internet packets. In some aspects, RoHC is initiated in a unidirectional configuration (e.g., a unidirectional mode, or U-mode) wherein compressed traffic is provided from a compressor to a decompressor without feedback from the compressor. RoHC may further be configured in a bidirectional configuration (e.g., a bidirectional mode, such as a bidirectional optimistic mode (O-mode) or a bidirectional reliable mode (R-mode)) to improve performance of RoHC when bidirectional communication between the compressor and the decompressor is possible or desired. In a bidirectional mode, the decompressor may provide feedback, such as error recovery requests, acknowledgements of context updates, and/or the like, to the decompressor. In some cases, the UE 145, 250 and the eNB 110, 210, 230 may both perform RoHC, which may conserve network resources and improve bandwidth efficiency. In such a case, the UE 145, 250 and the eNB 110, 210, 230 may be configured to perform RoHC based at least in part on similar parameters. For example, the UE 145, 250 and the eNB 110, 210, 230 may use the same compression algorithm, may compress the same types of packets, and/or the like. However, this may lead to inefficiency when available system resources or constraints of the UE 145, 250 are different than available system resources or constraints of the eNB 110, 210, 230.

RoHC may be used for Voice over IP (VoIP), Voice over LTE (VoLTE), and similar network traffic due to the relatively small size of payloads associated with such network traffic in comparison to headers associated with such network traffic. However, network traffic that is associated with a relatively large payload (e.g., TCP traffic and/or the like) may be less efficiently compressed using RoHC than network traffic that is associated with a relatively small payload.

For network traffic with relatively large payloads, the benefits of performing RoHC (e.g., improved network traffic efficiency, reduced packet size, and/or the like) may be outweighed by increased system resource consumption of UE 145, 250 (e.g., MIPS cycles, bus bandwidth, memory resources, thermal conditions, and/or the like). In such a case, it may be beneficial to configure the RoHC configuration and/or employ RoHC in a single direction (e.g., an uplink direction from the wireless communication device to another device, or a downlink direction from the other device to the wireless communication device). For example, the UE 145, 250 and the eNB 110, 210, 230 may be associated with different system resources or constraints, so it may be beneficial to configure RoHC to be performed in one direction and not the other, and/or to configure the UE 145, 250 to perform RoHC differently than the eNB 110, 210, 230.

Furthermore, it may be beneficial to update and/or reconfigure RoHC based at least in part on changing system resource availability and/or other conditions. For example, when system resources of the UE 145, 250 are scarce, it may be beneficial to reduce or cease compression of network traffic (e.g., network traffic inbound to the UE 145, 250 and/or outbound from the UE 145, 250), which may conserve system resources of the UE 145, 250.

Some techniques and apparatuses described herein permit configuration or adjustment of an RoHC configuration of a wireless communication device (e.g., a UE 145, 250 or an eNB 110, 210, 230) based at least in part on a system resource condition of the wireless communication device. For example, some techniques and apparatuses described herein may selectively compress particular packets, particular types of packets, and/or a particular quantity of packets based at least in part on the system resource condition. Some techniques and apparatuses described herein may use a token based approach to identify packets and/or portions of packets to compress, which may improve system resource utilization and/or conserve system resources. In some aspects, a wireless communication device may use one or more PDCP control Packet Data Units (PDUs) to indicate to and/or configure another device, for example based at least in part on the RoHC configuration, to identify compressed packets, which improves network bandwidth efficiency and conserves system resources of the wireless communication device.

Furthermore, some techniques and apparatuses described herein may configure the wireless communication device to perform RoHC in a single direction, which may be termed unidirectional RoHC. Unidirectional RoHC may be different from U-mode RoHC. For example, in U-mode RoHC, traffic is provided from the compressor to the decompressor without feedback from the decompressor. In unidirectional RoHC, as described herein, for example, traffic is provided from the compressor to the decompressor with feedback from the decompressor, and the RoHC procedure is performed in one direction and not the other. For example, RoHC may be performed in the downlink and not in the uplink, or RoHC may be performed in the uplink and not in the downlink. Additionally, or alternatively, RoHC may be configured differently in the downlink than in the uplink. Thus, network bandwidth efficiency and efficiency of utilization of processor and memory resources of the UE 145, 250 and the eNB 110, 210, 230 are improved.

As shown in FIG. 7, and by reference number 702, the UE 145, 250 may identify a system resource condition of a memory overflow (e.g., a memory overflow of memory associated with the UE 145, 250). In some aspects, the UE 145, 250 may identify the system resource condition based at least in part on an amount of available memory of the UE 145, 250 satisfying a particular threshold (e.g., 50% available, 25% available, 10% available, and/or the like). Additionally or alternatively, in some aspects, the UE 145, 250 may identify the system resource condition based at least in part on another system resource, such as a MIPS cycle availability value, a bus bandwidth availability value, an internal temperature of the device, and/or the like.

As shown by reference number 704, the UE 145, 250 may adjust an RoHC configuration of the UE 145, 250 based at least in part on identifying the system resource condition. Here, the UE 145, 250 determines to compress "k" out of every "n" TCP/IP packets, where k and n may be integers, and k may be less than n. For example, the UE 145, 250 may compress one out of every five TCP/IP packets transmitted by the UE 145, 250. By compressing one out of every five TCP/IP packets (e.g., as compared to compressing a higher ratio of TCP/IP packets, or all TCP/IP packets transmitted by the UE 145, 250), the UE 145, 250 reduces system resource usage of the UE 145, 250.

In some aspects, the UE 145, 250 may determine to compress a particular number of TCP/IP packets (e.g., 1/5 TCP/IP packets, 3/7 TCP/IP packets, 1/10 TCP/IP packets, and/or the like). For example, the UE 145, 250 may determine the particular number based at least in part on values associated with the system resource conditions. As a more particular example, the UE 145, 250 may compress a higher number of TCP/IP packets when system resources are more scarce than when system resources are less scarce, or may compress a lower number of TCP/IP packets when system resources are more scarce than when system resources are less scarce. Additionally, or alternatively, the UE 145, 250 may determine the particular number based at least in part on multiple, different thresholds with regard to multiple, different types of system resources. Additionally, or alternatively, the UE 145, 250 may use a lookup table to determine the number (e.g., based at least in part on values associated with the system resource conditions). In some aspects, the UE 145, 250 may compress part of a particular TCP/IP packet. For example, the UE 145, 250 may compress 50 percent of each TCP/IP packet, 50 percent of every tenth packet, or the like.

As shown by reference number 706, the UE 145, 250 may provide a PDCP control PDU to the eNB 110, 210, 230 that identifies TCP/IP packets to be compressed (e.g., and therefore should be decompressed by the eNB 110, 210, 230). Here, the PDCP control PDU identifies packets 1, 6, 11, 16, and so on. In some aspects, the PDCP control PDU may identify the TCP/IP packets using sequence numbers associated with the TCP/IP packets. In some aspects, the PDCP control PDU may identify TCP/IP packets that are associated with the PDCP control PDU (e.g., that are transmitted with the PDCP control PDU) as compressed or uncompressed. By identifying the TCP/IP packets to be compressed, the UE 145, 250 enables the eNB 110, 210, 230 to selectively process or decompress only the compressed TCP/IP packets, which conserves system resources of the eNB 110, 210, 230.

As shown by reference number 708, the UE 145, 250 may provide a TCP/IP traffic flow, including the compressed TCP/IP packets and the uncompressed TCP/IP packets, to the eNB 110, 210, 230. By compressing TCP/IP packets, system resources of the UE 145, 250 are conserved and/or uplink bandwidth utilization of the UE 145, 250 is improved.

As indicated above, FIG. 7 is provided as an example. Other examples are possible and may differ from what was described with respect to FIG. 7.

Figure 8:
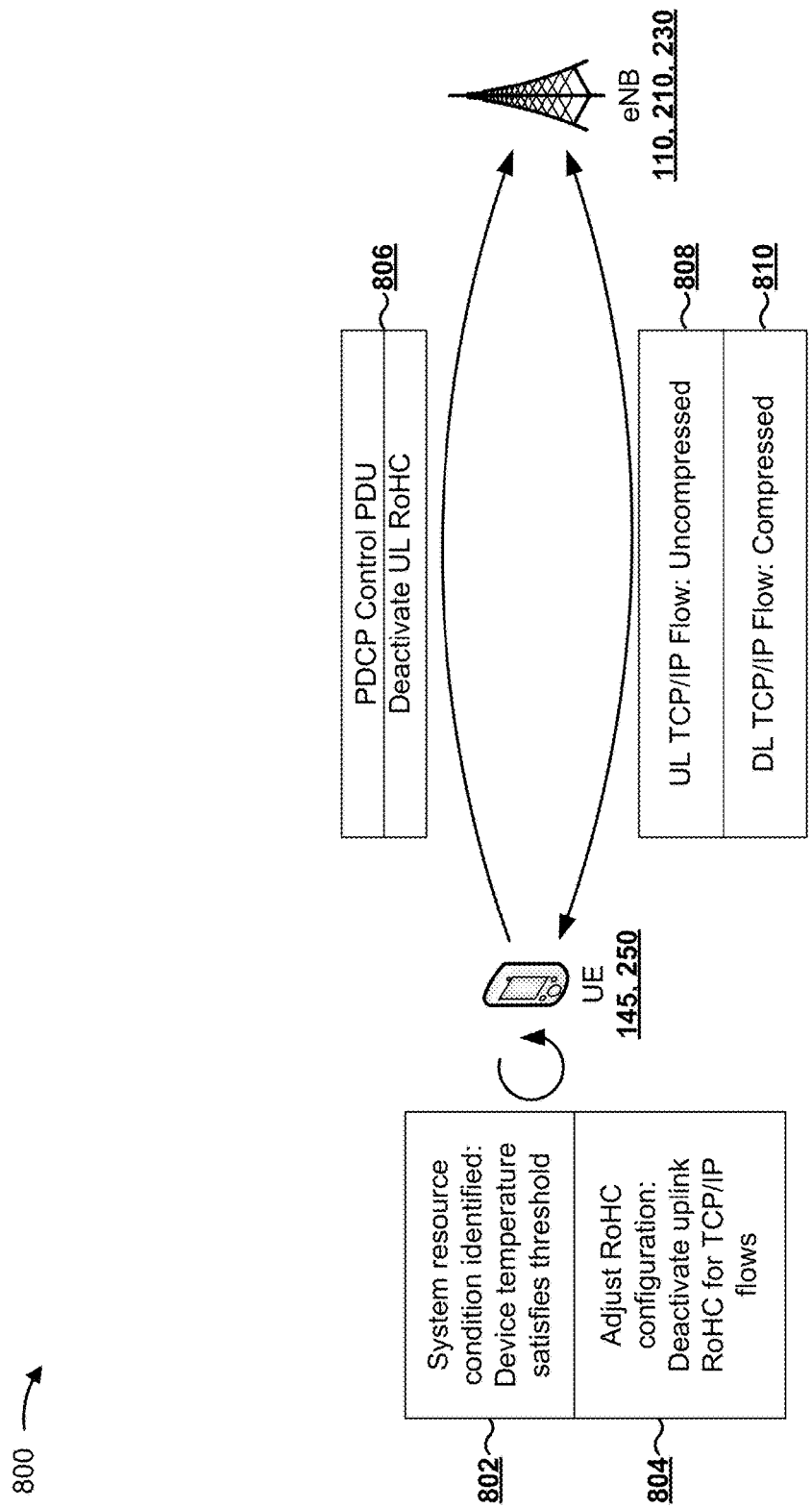
FIG. 8 is a diagram illustrating another example of unidirectional RoHC for a TCP/IP traffic flow, in accordance with various aspects of the present disclosure.

FIG. 8 is a diagram illustrating another example 800 of unidirectional RoHC for a TCP/IP traffic flow, in accordance with various aspects of the present disclosure.

As shown in FIG. 8, and by reference number 802, the UE 145, 250 may identify a system resource condition based at least in part on a device temperature of the UE 145, 250 satisfying a threshold (e.g., an internal temperature of the UE 145, 250). In some aspects, the UE 145, 250 may identify the system resource condition based at least in part on another system resource, such as a MIPS cycle availability value, a memory value associated with the UE 145, 250, a bus bandwidth availability value, and/or the like.

As shown by reference number 804, the UE 145, 250 may update (e.g., adjust) a RoHC configuration based at least in part on identifying the system resource condition. Here, the UE 145, 250 configures uplink RoHC to be deactivated for a TCP/IP traffic flow from the UE 145, 250. By configuring uplink RoHC to be deactivated, the UE 145, 250 conserves system resources that would otherwise be used by the UE 145, 250 to compress the uplink TCP/IP traffic flow.

As shown by reference number 806, the UE 145, 250 may provide, to the eNB 110, 210, 230, a PDCP control PDU indicating that uplink RoHC has been deactivated for the uplink TCP/IP traffic flow. The eNB 110, 210, 230 may configure processing or decompression of the uplink TCP/IP traffic flow based at least in part on the PDCP control PDU. For example, the eNB 110, 210, 230 may determine that the uplink TCP/IP traffic flow is not to be decompressed based at least in part on the PDCP control PDU indicating that the uplink RoHC has been deactivated for the uplink TCP/IP traffic flow, which conserves system resources of the eNB 110, 210, 230 that would otherwise be used to decompress the uplink TCP/IP traffic flow.

As shown by reference number 808, the UE 145, 250 may provide the uplink TCP/IP traffic flow as an uncompressed traffic flow, which conserves system resources of the UE 145, 250. As shown by reference number 810, for example, the eNB 110, 210, 230 may provide a compressed downlink TCP/IP traffic flow (e.g., compressed using RoHC). Alternatively, in aspects, the eNB 110, 210, 230 may provide an uncompressed downlink TCP/IP traffic flow. In some aspects, the UE 145, 250 may cause the eNB 110, 210, 230 to reconfigure RoHC for the downlink TCP/IP traffic flow. For example, the UE 145, 250 may provide a message (e.g., a PDCP control PDU or another message) indicating that the eNB 110, 210, 230 is to deactivate or reconfigure RoHC for the downlink TCP/IP traffic flow, and the eNB 110, 210, 230 may deactivate or reconfigure RoHC for the downlink TCP/IP traffic flow based at least in part on the message. For example, the eNB 110, 210, 230 may provide an uncompressed downlink TCP/IP traffic flow, may compress particular packets, packet types, or portions of packets of the downlink TCP/IP traffic flow, may use a particular compression algorithm, and/or the like. In this way, system resources of the eNB 110, 210, 230 are conserved that would otherwise be used to compress the downlink TCP/IP traffic flow, and system resources of the UE 145, 250 are conserved that would otherwise be used to decompress the downlink TCP/IP traffic flow. In some aspects, to provide bidirectional TCP/IP traffic flow, system resources (e.g., memory and/or the like) of the UE 145, 250 may be increased.

As indicated above, FIG. 8 is provided as an example. Other examples are possible and may differ from what was described with respect to FIG. 8.

Figure 9:
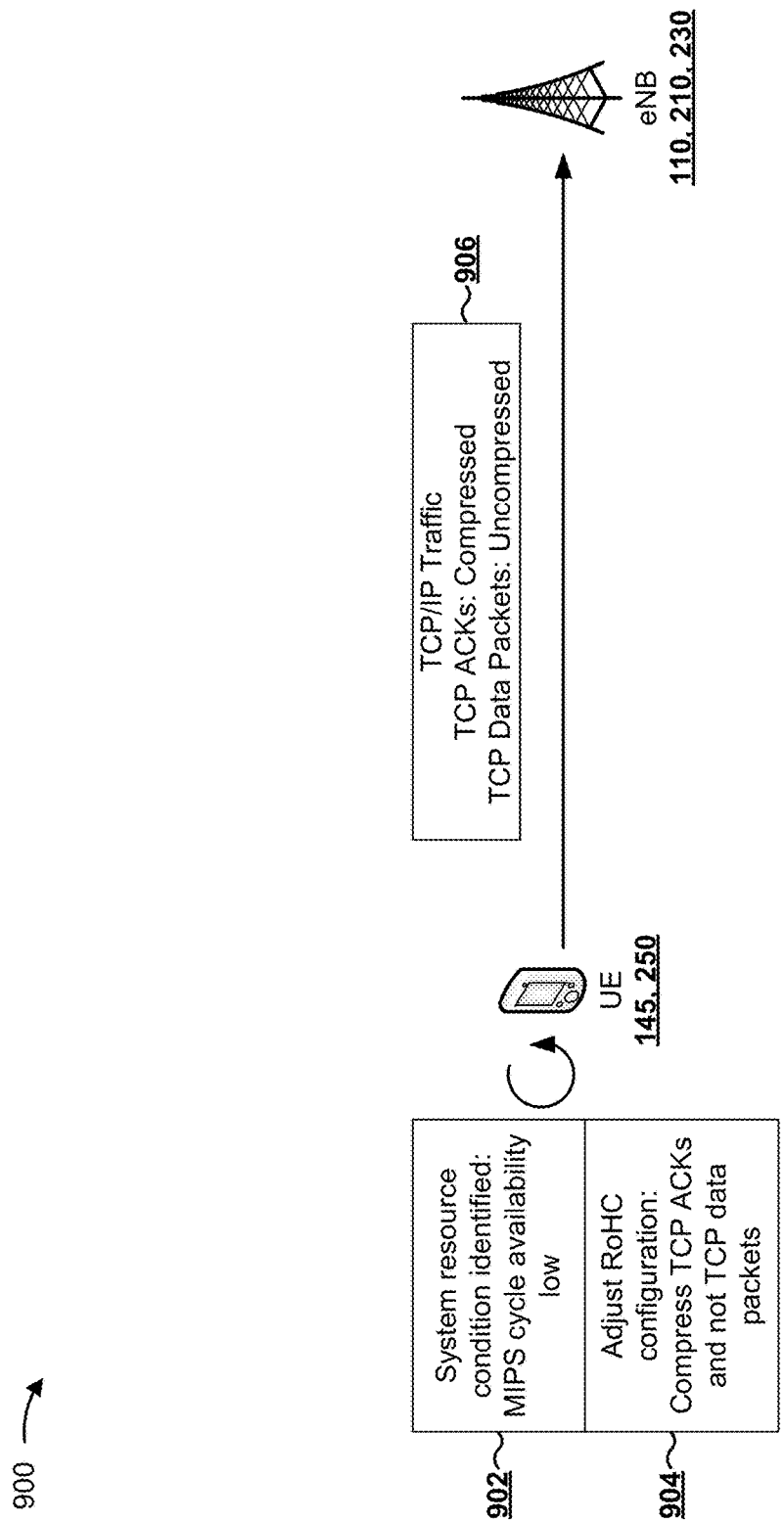
FIG. 9 is a diagram illustrating another example of unidirectional RoHC for a TCP/IP traffic flow, in accordance with various aspects of the present disclosure.

FIG. 9 is a diagram illustrating another example 900 of unidirectional RoHC for a TCP/IP traffic flow, in accordance with various aspects of the present disclosure.

As shown in FIG. 9, and by reference number 902, the UE 145, 250 may identify a system resource condition relating to a MIPS cycle availability value of the UE 145, 250. Additionally or alternatively, in some aspects, the UE 145, 250 may identify the system resource condition based at least in part on another system resource, such as a memory value associated with the UE 145, 250, a bus bandwidth availability value of the UE 145, 250, a device temperature of the UE 145, 250, and/or the like.

As shown by reference number 904, the UE 145, 250 may update or adjust an RoHC configuration of the UE 145, 250 based at least in part on identifying the system resource condition. Here, the UE 145, 250 determines to compress a type of packet. For example, the UE 145, 250 at least determines to compress TCP ACK packets and not to compress TCP data packets. For example, the TCP ACK packets may have a relatively small payload as compared to the TCP data packets. Additionally, or alternatively, the TCP ACK packets may include, for example, 60 bytes of information, and may include a relatively small quantity of useful information (e.g., one or more octets identifying a sequence number associated with the TCP ACK packets). Thus, compression of the TCP ACK packets may be more efficient than compression of the TCP data packets. The UE 145, 250 may conserve system resources of the UE 145, 250 by compressing the TCP ACK packets and not the TCP data packets, as compared to compressing the TCP ACK packets and the TCP data packets.

The UE 145, 250 may select a compression technique from multiple, different compression techniques based at least in part on a state of the system resource condition. For example, the UE 145, 250 may store information identifying one or more thresholds for the system resource condition and techniques associated with the one or more thresholds, and may use the one or more thresholds to identify a particular technique based at least in part on the system resource condition. In some aspects, the UE 145, 250 may switch from one compression technique to another compression technique based at least in part on available system resources. For example, the UE 145, 250 may use a higher-efficiency compression technique when system resources are relatively scarce, and may use a lower-efficiency compression technique when system resources are relatively plentiful.

As shown by reference number 906, the UE 145, 250 may provide an uplink TCP/IP traffic flow to the eNB 110, 210, 230. As shown, the uplink TCP/IP traffic flow may include compressed TCP ACK packets and uncompressed TCP data packets. In this way, the UE 145, 250 improves bandwidth utilization of the UE 145, 250 and/or conserves system resources of the UE 145, 250. In some aspects, the UE 145, 250 may provide a message indicating that the TCP ACK packets are compressed and/or the TCP data packets are uncompressed. For example, the UE 145, 250 may provide a PDCP control message or another type of message indicating that the TCP ACK packets are compressed and/or the TCP data packets are uncompressed (e.g., based at least in part on sequence numbers associated with the TCP ACK packets and the TCP data packets, based at least in part on the TCP ACK packets and the TCP data packets being associated with the message, and/or the like). The eNB 110, 210, 230 may selectively process or decompress packets of the uplink TCP/IP traffic flow based at least in part on the message, which conserves system resources of the eNB 110, 210, 230 that would otherwise be used to process or decompress each packet of the uplink TCP/IP traffic flow.

As indicated above, FIG. 9 is provided as an example. Other examples are possible and may differ from what was described with respect to FIG. 9.

Figure 10:
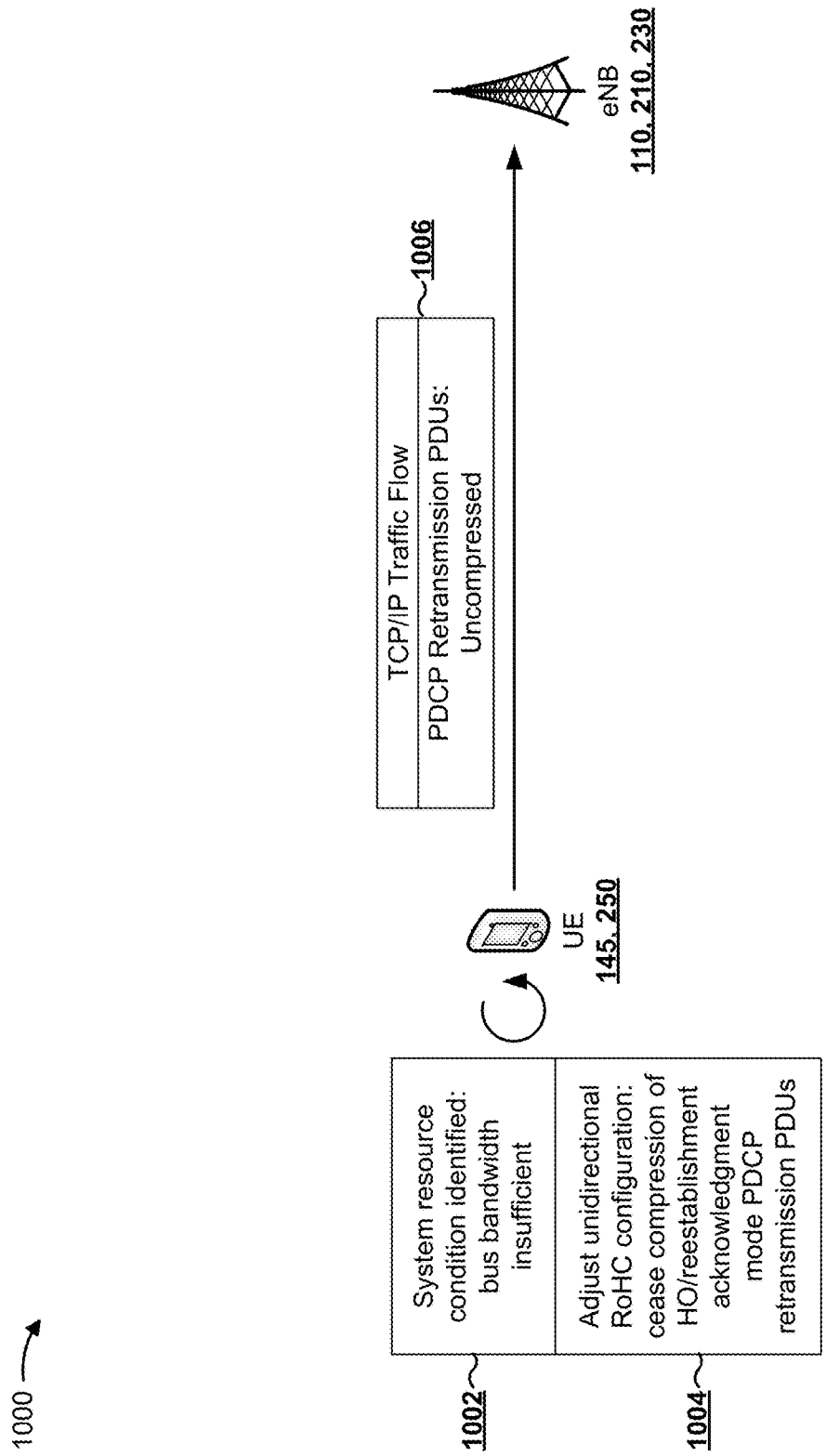
FIG. 10 is a diagram illustrating another example of unidirectional RoHC for a TCP/IP traffic flow, in accordance with various aspects of the present disclosure.

FIG. 10 is a diagram illustrating another example 1000 of unidirectional RoHC for a TCP/IP traffic flow, in accordance with various aspects of the present disclosure.

As shown in FIG. 10, and by reference number 1002, the UE 145, 250 may identify a system resource condition relating to a bus bandwidth availability value of the UE 145, 250. Additionally or alternatively, in some aspects, the UE 145, 250 may identify the system resource condition based at least in part on another system resource, such as a memory value associated with the UE 145, 250, a MIPS cycle availability value of the UE 145, 250, a device temperature of the UE 145, 250, and/or the like.

As shown by reference number 1004, the UE 145, 250 may update or adjust an RoHC configuration of the UE 145, 250 based at least in part on identifying the system resource condition. Here, the UE 145, 250 reduces the number of and/or ceases compression of handover/reestablishment acknowledgment mode (AM) PDCP retransmission PDUs. For example, when the UE 145, 250 is handed over from a first cell to a second cell during a call, the UE 145, 250 may transmit handover/reestablishment PDCP retransmission PDUs to reestablish a call associated with the UE 145, 250 (e.g., a VoIP call, a VoLTE call, and/or the like). These PDCP retransmission PDUs may be more variable than other PDCP PDUs (e.g., other data PDUs associated with the PDCP process), which may reduce effectiveness of compression of the PDCP retransmission PDUs. The UE 145, 250 may cease compression of the PDCP retransmission PDUs, which conserves system resources of the UE 145, 250 that would otherwise be used to compress the PDCP retransmission PDUs at a high cost relative to the benefits of compression of the PDCP retransmission PDUs.

As shown by reference number 1006, the UE 145, 250 provides, to the eNB 110, 210, 230, an uplink TCP/IP traffic flow that includes uncompressed PDCP retransmission PDUs. In some aspects, the UE 145, 250 may provide a message indicating that the PDCP retransmission PDUs are uncompressed. For example, the UE 145, 250 may provide a PDCP control message or another type of message indicating that the PDCP retransmission PDUs are uncompressed (e.g., based at least in part on sequence numbers associated with the PDCP retransmission PDUs, based at least in part on the PDCP retransmission PDUs being associated with the message, and/or the like), which conserves system resources of the eNB 110, 210, 230 that would otherwise be used to process or decompress the PDCP retransmission PDUs.

As indicated above, FIG. 10 is provided as an example. Other examples are possible and may differ from what was described with respect to FIG. 10.

Figure 11:
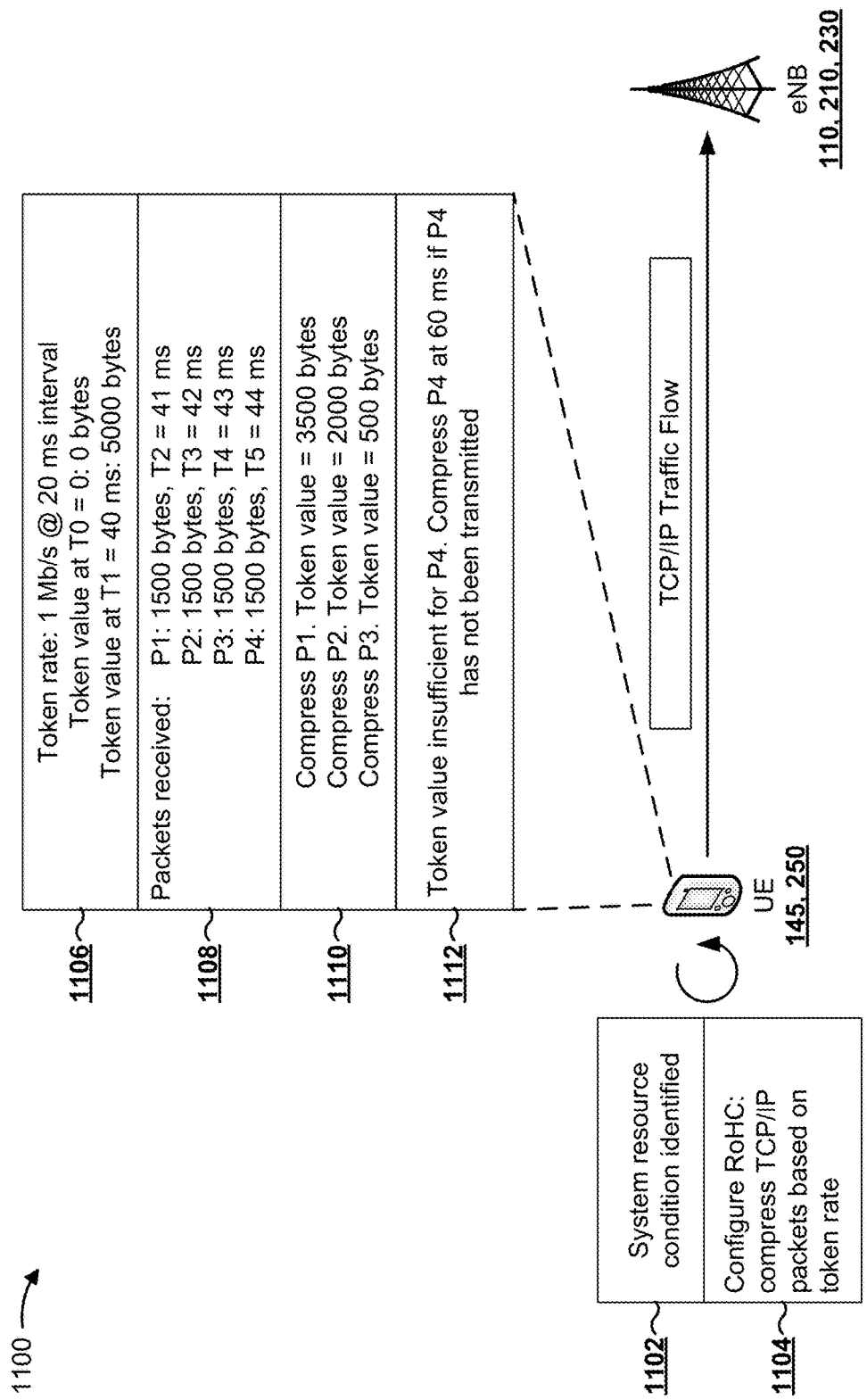
FIG. 11 is a diagram illustrating another example of unidirectional RoHC for a TCP/IP traffic flow, in accordance with various aspects of the present disclosure.

FIG. 11 is a diagram illustrating another example 1100 of unidirectional RoHC for a TCP/IP traffic flow, in accordance with various aspects of the present disclosure.

As shown in FIG. 11, and by reference number 1102, the UE 145, 250 may identify a system resource condition relating to the UE 145, 250. For example, the UE 145, 250 may identify the system resource condition based at least in part on a memory value associated with the UE 145, 250, a MIPS cycle availability value of the UE 145, 250, a device temperature of the UE 145, 250, another system resource, and/or a combination of the above or other system resources, as described in more detail in connection with FIGS. 7-10, above.

As shown by reference number 1104, the UE 145, 250 may configure an RoHC configuration of the UE 145, 250 based at least in part on identifying the system resource condition. Here, the UE 145, 250 selectively compresses TCP/IP packets of an uplink TCP/IP traffic flow based at least in part on a token based mechanism. A data rate (e.g., in megabits per second, bytes per second, and/or the like) may be based at least in part on token availability. Additionally or alternatively, compression of TCP/IP packets may be selective based at least in part on token availability. In aspects, token availability may limit a quantity of bytes to be compressed.

As shown by reference number 1106, the token accumulation and/or availability rate associated with the UE 145, 250 is 1 megabit per second. The UE 145, 250 may increase a token availability value (e.g., a quantity of bits, bytes, megabytes, and/or the like) at the token rate (e.g., at a particular interval, such as every 20 ms, as shown by reference number 1106). As shown, at a time T0, the token value of the UE 145, 250 is 0. As further shown, at a time T1 of 40 ms, the token value of the UE 145, 250 is 5000 bytes (e.g., 1 Mb/s*40 ms=40000 bits=5000 bytes). In some aspects, the token availability value may have an upper limit. This upper limit may be selected to avoid system resource overload associated with compressing a burst of TCP/IP packets.

As shown by reference number 1108, the UE 145, 250 receives packets P1, P2, P3, and P4 at times T2 (e.g., 41 ms), T3 (e.g., 42 ms), T4 (e.g., 43 ms), and T5 (e.g., 44 ms), respectively. As further shown, packets P1, P2, P3, and P4 each have a size of 1500 bytes.

As shown by reference number 1110, the UE 145, 250 may selectively compress the packets based at least in part on the token value. In aspects, when the token availability value matches or exceeds the size of the TCP/IP packet, the UE 145, 250 may compress the packet and subtract the size of the TCP/IP packet from the token availability value. Here, the UE 145, 250 compresses packets P1, P2, and P3.

In aspects, as shown by reference number 1112, when the token availability value does not match or exceed the size of a TCP/IP packet, the UE 145, 250 may compress the TCP/IP packet when the token availability value increases to a value that matches or exceeds the size of the TCP/IP packet, assuming that the TCP/IP packet has not been transmitted. Here, the UE 145, 250 compresses P4 at a time of 60 ms (e.g., based at least in part on the token availability value increasing to a value greater than 1500 bytes at 60 ms) if the TCP/IP packet has not been transmitted at the time of 60 ms. This may improve bandwidth efficiency in a situation where, for example, an uplink grant has not yet been granted for the TCP/IP packet at the time of 60 ms.

In some aspects, the UE 145, 250 may compress part of the TCP/IP packet based at least in part on the token availability value. For example, the UE 145, 250 may compress a portion of the TCP/IP packet equal to the token availability value. In this way, the UE 145, 250 reduces delay associated with transmitting the TCP/IP packet.

As shown, the UE 145, 250 provides the TCP/IP traffic flow to the eNB 110, 210, 230. Assume that the TCP/IP traffic flow includes compressed packets P1, P2, P3, and P4. In some aspects, the UE 145, 250 may provide a message identifying which packets, of the TCP/IP traffic flow, are compressed (e.g., a PDCP control message or another type of message), which conserves system resources of the eNB 110, 210, 230 that would otherwise be used to identify TCP/IP packets as compressed or uncompressed. In some aspects, the UE 145, 250 may set a flag of a TCP/IP packet to indicate whether the packet is compressed or uncompressed.

As indicated above, FIG. 11 is provided as an example. Other examples are possible and may differ from what was described with respect to FIG. 11.

Figure 12:
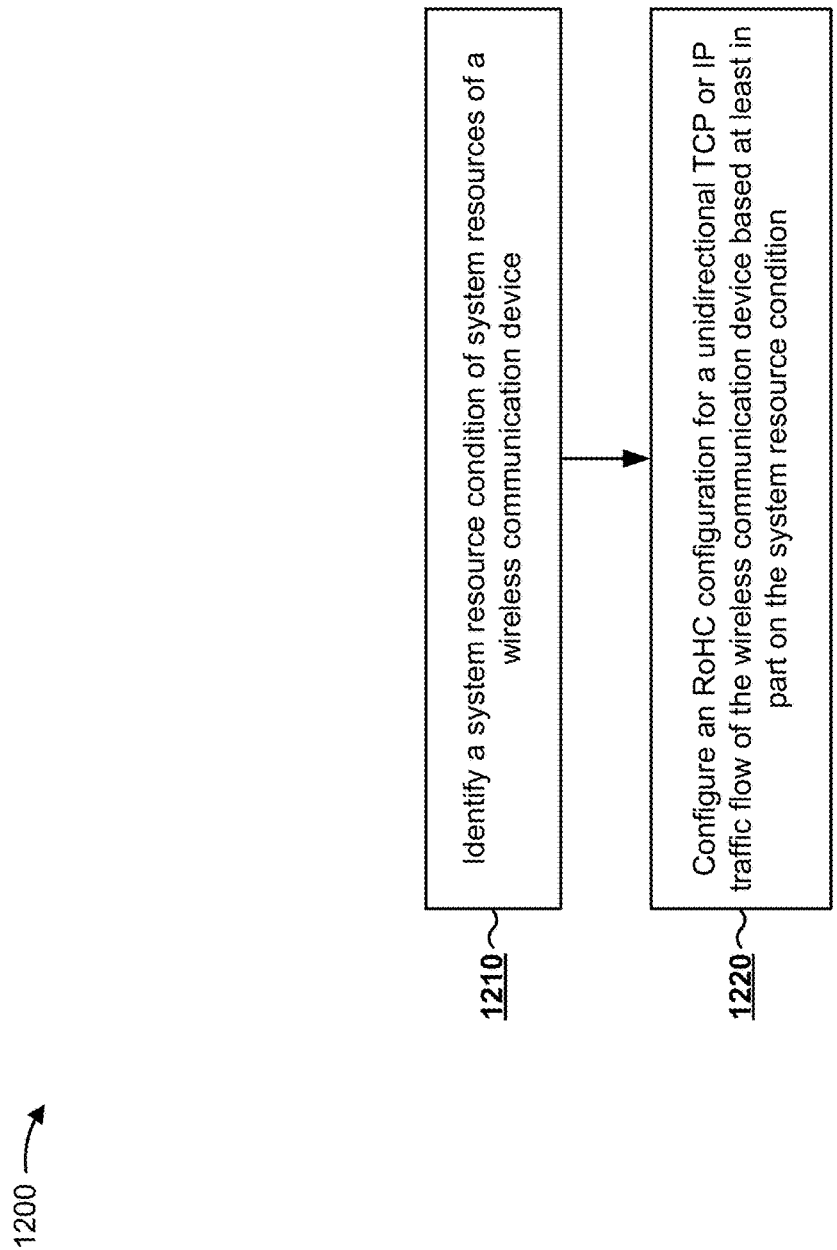
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., UE 145, 250) performs configuration of RoHC for a unidirectional TCP/IP traffic flow.

As shown in FIG. 12, in some aspects, process 1200 may include identifying a system resource condition of system resources of a wireless communication device (block 1210). For example, the UE 145, 250 may identify a system resource condition. The UE 145, 250 may identify the system resource condition with regard to system resources of the UE 145, 250. In some aspects, an eNB 110, 210, 230 may identify a system resource condition with regard to system resources of the eNB 110, 210 230. For example, the wireless communication device may correspond to the eNB 110, 210, 230. In some aspects, an eNB 110, 210, 230 may identify a system resource condition with regard to system resources of the UE 145, 250, or vice versa. Examples of the system resource condition are provided above.

As shown in FIG. 12, in some aspects, process 1200 may include configuring and/or employing a unidirectional RoHC configuration for a TCP or IP traffic flow (e.g., a unidirectional TCP or IP traffic flow) of the wireless communication device (block 1220). For example, the UE 145, 250 may configure an RoHC configuration of the UE 145, 250 for a unidirectional TCP or IP traffic flow of the UE 145, 250. The unidirectional TCP or IP traffic flow may include an uplink traffic flow or a downlink traffic flow. In some aspects, the eNB 110, 210, 230 may configure an RoHC configuration of the eNB 110, 210 230. For example, the wireless communication device may correspond to the eNB 110, 210, 230. In some aspects, the eNB 110, 210, 230 may configure an RoHC configuration of the UE 145, 250, or vice versa.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a wireless communication device, in accordance with various aspects of the present disclosure. Example process 1300 is an example where a transmitter device (e.g., UE 145, 250, eNB 110, 210, 230, or another wireless communication device) performs configuration of RoHC for a unidirectional TCP/IP traffic flow.

As shown in FIG. 13, in some aspects, process 1300 may include identifying a system resource condition of at least one of a transmitter device or receiver device of one or more data units (block 1310). For example, the transmitter device may identify a system resource condition. The system resource condition may relate to resource utilization or availability of the transmitter device. For example, the transmitter device may deactivate or reduce application of RoHC (e.g., in a single direction) when the system resource condition indicates that resources of the transmitter device are scarce. Additionally, or alternatively, the transmitter device may activate or increase application of RoHC (e.g., in a single direction) when the system resource condition indicates that resources of the transmitter device are not scarce or that it would be beneficial to apply RoHC (e.g., in a single direction).

As shown in FIG. 13, in some aspects, process 1300 may include configuring robust header compression in a single direction for wireless communication of the one or more data units between the transmitter device and the receiver device (block 1320). For example, the transmitter device may configure RoHC in a single direction (e.g., unidirectional RoHC) for wireless communication of the one or more data units between the transmitter device and the receiver device. In some aspects, the transmitter device may activate or deactivate RoHC for a transmission of the transmitter device. Additionally, or alternatively, the transmitter device may perform RoHC for a subset of transmitted data units, or may compress part of a data unit. In aspects, configuring robust header compression in a single direction for wireless communication of the one or more data units between the transmitter device and the receiver device includes dynamically configuring robust header compression in a single direction for wireless communication of the one or more data units between the transmitter device and the receiver device. In aspects, configuring robust header compression in a single direction for wireless communication of the one or more data units between the transmitter device and the receiver device includes configuring (e.g., dynamically configuring) robust header compression in a single direction for wireless communication of the one or more data units between the transmitter device and the receiver device from a bi-directional robust header compression configuration or from a configuration in which robust header compression is not employed.

As shown in FIG. 13, in some aspects, process 1300 may include processing the one or more data units based at least in part on configuring the robust header compression (block 1330). For example, the transmitter device may process the one or more data units based at least in part on the configuration of the RoHC. In some aspects, the transmitter device may compress the one or more data units. In some aspects, the transmitter device may compress a subset of the one or more data units. In some aspects, the transmitter device may compress part of a data unit.

In some aspects, processing the data units based at least in part on the configuration includes compressing a subset of the one or more data units. In some aspects, the transmitter device may transmit a message indicating the subset of the data units. In some aspects, compressing the subset of the one or more data units may include compressing the subset of the one or more data units to be transmitted based at least in part on a token based mechanism.

In some aspects, processing the one or more data units based at least in part on the configuration includes compressing the one or more data units based at least in part on a type of the one or more data units. In some aspects, configuring robust header compression in a single direction for wireless communication of the one or more data units between the transmitter device and the receiver device includes configuring robust header compression in a single direction based at least in part on a message received over an air interface.

In some aspects, the system resource condition is based at least in part on at least one of an amount of available memory, a processor cycle availability, a bus bandwidth availability, an internal temperature, or a combination thereof. In some aspects, processing the one or more data units based at least in part on the configuration may include compressing a portion of a data unit of the one or more data units.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   identifying a system resource condition of at least one of the transmitter device or a receiver device of one or more data units,
      the system resource condition including a condition associated with a processor cycle availability value;
   configuring unidirectional robust header compression in a single direction and not another direction, based on the system resource condition of at least one of the transmitter device or the receiver device, for wireless communication of the one or more data units between the transmitter device and the receiver device,
      wherein configuring the unidirectional robust header compression in the single direction includes:
         determining to compress packets of Transmission Control Protocol (TCP) acknowledgment (ACK) packet type in the single direction and not to compress TCP data packets in the single direction based on the processor cycle availability value satisfying a threshold value; and
         updating the unidirectional robust header compression to compress TCP ACK packets in the single direction, based on determining to compress packets of the TCP ACK packet type, and not to compress TCP data packets in the single direction;
   processing the one or more data units based at least in part on configuring the unidirectional robust header compression; and
   transmitting the one or more processed data units to the receiver device.

2. The method of claim 1, wherein processing the one or more data units includes compressing a subset of the one or more data units.

3. The method of claim 2, further comprising transmitting a message indicating the subset of the one or more data units.

4. The method of claim 2, wherein compressing the subset of the one or more data units includes compressing the subset of the one or more data units to be transmitted based at least in part on a token based mechanism.

5. The method of claim 1, wherein configuring the unidirectional robust header compression in the single direction for wireless communication of the one or more data units between the transmitter device and the receiver device includes configuring the unidirectional robust header compression in the single direction based at least in part on a message received over an air interface.

6. The method of claim 1, wherein the system resource condition is further based at least in part on at least one of:
   an amount of available memory,
   a bus bandwidth availability, or
   a combination thereof.

7. The method of claim 1, wherein processing the one or more data units includes compressing a portion of a data unit of the one or more data units.

8. The method of claim 1, wherein configuring the unidirectional robust header compression in the single direction includes:
   ceasing compression of handover/reestablishment acknowledgment mode (AM) packet data convergence protocol (PDCP) retransmission packet data units (PDUs) based on the system resource condition.

9. A transmitter device for wireless communication, comprising:
   a transceiver;
   a memory; and
   one or more processors operatively coupled to at least one of the memory or the transceiver, the one or more processors configured to:
      identify a system resource condition of at least one of the transmitter device or a receiver device of one or more data units,
         the system resource condition including a condition associated with a processor cycle availability value;
      configure unidirectional robust header compression in a single direction and not another direction, based on the system resource condition of at least one of the transmitter device or the receiver device, for wireless communication of the one or more data units between the transmitter device and the receiver device,
         wherein the one or more processors, when configuring the unidirectional robust header compression in the single direction, are to:
            determine to compress packets of Transmission Control Protocol (TCP) acknowledgment (ACK) packet type in the single direction and not to compress TCP data packets in the single direction based on the processor cycle availability value satisfying a threshold value; and
            update the unidirectional robust header compression to compress TCP ACK packets in the single direction, based on determining to compress packets of the TCP ACK packet type, and not to compress TCP data packets in the single direction; and
      process the one or more data units based at least in part on configuring the unidirectional robust header compression; and
   the transceiver configured to:
      transmit the one or more processed data units to the receiver device.

10. The transmitter device of claim 9, wherein the one or more processors, when processing the one or more data units, are configured to:
    compress a subset of the one or more data units.

11. The transmitter device of claim 10, wherein the transceiver is further configured to:
    transmit a message indicating the subset of the one or more data units.

12. The transmitter device of claim 10, wherein the one or more processors, when compressing the subset of the one or more data units, are configured to:
  compress the subset of the one or more data units to be transmitted based at least in part on a token based mechanism.

13. The transmitter device of claim 9, wherein the one or more processors, when processing the one or more data units, are configured to:
  cease compression of handover/reestablishment acknowledgment mode (AM) packet data convergence protocol (PDCP) retransmission packet data units (PDUs) based on the system resource condition.

14. The transmitter device of claim 9, wherein the one or more processors, when configuring the unidirectional robust header compression in the single direction for wireless communication of the one or more data units between the transmitter device and the receiver device, are configured to:
  configure the unidirectional robust header compression in the single direction based at least in part on a message received over an air interface.

15. The transmitter device of claim 9, wherein the system resource condition is further based at least in part on at least one of:
  an amount of available memory,
  a bus bandwidth availability, or
  a combination thereof.

16. The transmitter device of claim 9, wherein the one or more processors, when processing the one or more data units, are configured to:
  compress a portion of a data unit of the one or more data units.

17. An apparatus for wireless communication, comprising:
  means for identifying a system resource condition of at least one of the apparatus or a receiver device of one or more data units,
    wherein the system resource condition includes a condition associated with a processor cycle availability value, and
    wherein the apparatus is configured to be a transmitter device of the one or more data units;
  means for configuring unidirectional robust header compression in a single direction and not another direction, based on the system resource condition of at least one of the transmitter device or the receiver device, for wireless communication of the one or more data units between the apparatus and the receiver device,
    wherein the unidirectional robust header compression is configured to:
      determine to compress packets of Transmission Control Protocol (TCP) acknowledgment (ACK) packet type in the single direction and not to compress TCP data packets in the single direction based on the processor cycle availability value satisfying a threshold value; and
      update the unidirectional robust header compression to compress TCP ACK packets in the single direction, based on determining to compress packets of the TCP ACK packet type, and not to compress TCP data packets in the single direction;
  means for processing the one or more data units based at least in part on configuring the unidirectional robust header compression; and
  means for transmitting the one or more processed data units to the receiver device.

18. The apparatus of claim 17, wherein the means for processing the one or more data units comprises means for compressing a subset of the one or more data units.

19. The apparatus of claim 18, wherein the means for transmitting comprises means for transmitting a message indicating the subset of the one or more data units.

20. The apparatus of claim 18, wherein the means for compressing the subset of the one or more data units includes means for compressing the subset of the one or more data units to be transmitted based at least in part on a token based mechanism.

21. The apparatus of claim 17, wherein the means for configuring the unidirectional robust header compression in the single direction for wireless communication of the one or more data units between the apparatus and the receiver device comprises means for configuring the unidirectional robust header compression in the single direction based at least in part on a message received over an air interface.

22. The apparatus of claim 17, wherein the system resource condition is further based at least in part on at least one of:
  an amount of available memory,
  a bus bandwidth availability, or
  a combination thereof.

23. The apparatus of claim 17, wherein the means for processing the one or more data units comprises means for compressing a portion of a data unit of the one or more data units.

24. The apparatus of claim 17, wherein the unidirectional robust header compression is configured to:
  cease compression of handover/reestablishment acknowledgment mode (AM) packet data convergence protocol (PDCP) retransmission packet data units (PDUs) based on the system resource condition.

25. A non-transitory computer-readable medium storing one or more instructions for wireless communication, the one or more instructions comprising:
  one or more instructions that, when executed by one or more processors of a transmitter device, cause the one or more processors to:
    identify a system resource condition of at least one of the transmitter device or a receiver device of one or more data units,
      the system resource condition including a condition associated with a processor cycle availability value;
    configure unidirectional robust header compression in a single direction and not another direction, based on the system resource condition of at least one of the transmitter device or the receiver device, for wireless communication of the one or more data units between the transmitter device and the receiver device,
      wherein the one or more instructions, that cause the one or more processors to configure the unidirectional robust header compression, cause the one or more processors to:
        determine to compress packets of Transmission Control Protocol (TCP) acknowledgment (ACK) packet type in the single direction and not to compress TCP data packets in the single direction based on the processor cycle availability value satisfying a threshold value; and
        update the unidirectional robust header compression to compress TCP ACK packets in the single direction, based on determining to compress packets of the TCP ACK packet type, and not to compress TCP data packets in the single direction;

process the one or more data units based at least in part on configuring the unidirectional robust header compression; and transmit the one or more processed data units to the receiver device.

26. The non-transitory computer-readable medium of claim 25, wherein the one or more instructions, that cause the one or more processors to process the one or more data units, cause the one or more processors to:

compress a subset of the one or more data units.

27. The non-transitory computer-readable medium of claim 26, wherein the one or more instructions, when executed by the one or more processors, further cause the one or more processors to:

transmit a message indicating the subset of the one or more data units.

28. The non-transitory computer-readable medium of claim 26, wherein the one or more instructions, that cause the one or more processors to compress the subset of the one or more data units, cause the one or more processors to:

compress the subset of the one or more data units to be transmitted based at least in part on a token based mechanism.

29. The non-transitory computer-readable medium of claim 25, wherein the one or more instructions, that cause the one or more processors to process the one or more data units, cause the one or more processors to:

cease compression of handover/reestablishment acknowledgment mode (AM) packet data convergence protocol (PDCP) retransmission packet data units (PDUs) based on the system resource condition.

30. The non-transitory computer-readable medium of claim 25, wherein the one or more instructions, that cause the one or more processors to configure the unidirectional robust header compression in the single direction for wireless communication of the one or more data units between the transmitter device and the receiver device, cause the one or more processors to:

configure the unidirectional robust header compression in the single direction based at least in part on a message received over an air interface.

\* \* \* \* \*